3,087,378
DEVICE FOR TESTING EYES
Alphonso F. Stanonis, Des Plaines, Ill., assignor, by mesne assignments, to World Magnetics, Inc., a corporation of Michigan
Filed May 8, 1958, Ser. No. 733,999
13 Claims. (Cl. 88—20)

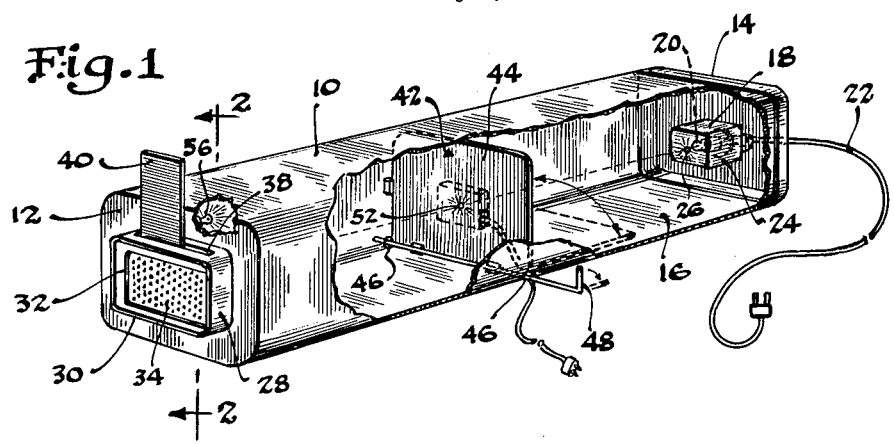
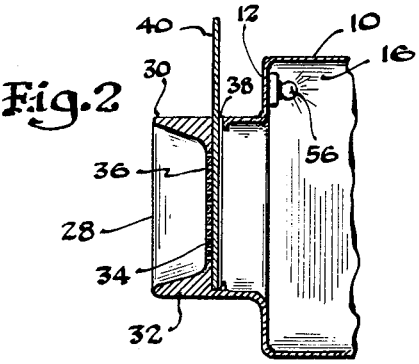
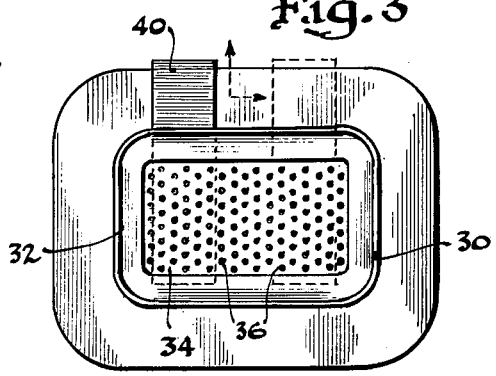
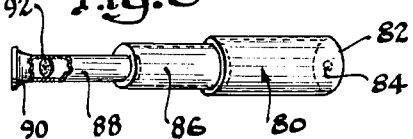
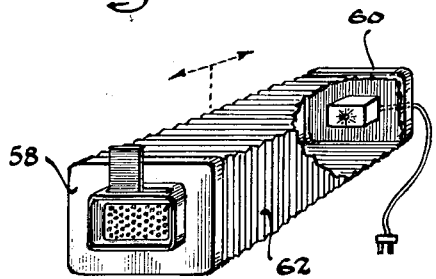
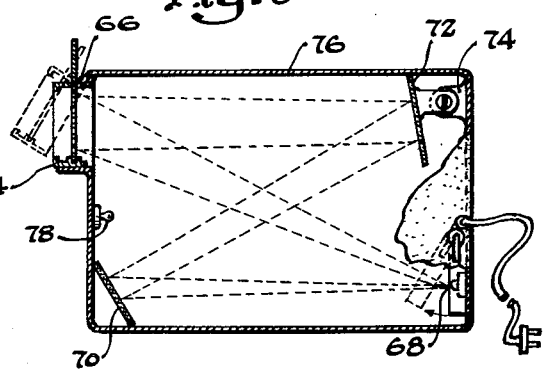
Inventor
Alphonso F. Stanonis
By Paul L. Ahern
Attorney

United States Patent Office 3,087,378
Patented Apr. 30, 1963

This invention relates to an instrument for the detection of defective vision and more particularly to an apparatus and method for testing the eyes.

It is recognized as being increasingly important to be able to detect abnormalities in human eyes, especially among young school children and even among pre-school children, since the earlier the abnormality is detected the more effective may be the treatment of it. It has been customary in the past to determine myopia or hyperopia by use of a chart having groups of letters of the alphabet of different size and to have the person read from large to small until he can no longer make out the letters. For detection of astigmatism a type of wheel having spokes represented by dark parallel lines radiating from the hub is used.

In the test for myopia or hyperopia the previously known method is not very reliable and is far from convenient. A relatively large space is required in order that the patient be far enough away from the chart. Its reliability is limited in the case of small children who cannot read, and in the case of patients who intentionally or unintentionally memorize the letters.

It is a principal object of the invention to provide an apparatus for detection of visual abnormalities of the eyes, which will be small, portable and inexpensive.

Another object of the invention is to provide an apparatus for detection of visual abnormalities of the eyes which is not dependent upon the ability of the subject to recognize letters of the alphabet nor to choose among lines of different density of color.

Another object of the invention is to provide an apparatus for detection of visual abnormalities of the eyes which rules out any possibility of the subject's memorizing the test.

A further object of the invention is to provide a method for testing eyes which will be quick and convenient, and which rules out possibilities of error.

These and other objects and advantages of the invention will become more apparent upon a study of the following detailed description thereof, taken in conjunction with the accompanying drawings in which:

FIGURE 1 is a view, mainly in perspective, of one embodiment of the invention but with some areas broken away to reveal the inner arrangement of elements of the apparatus;

FIGURE 2 is a cross-sectional view taken along the lines 2—2 in FIGURE 1;

FIGURE 3 is a plan view looking at the front end or eyepiece of the apparatus shown in FIGURE 1;

FIGURE 4 is a perspective view of another embodiment of the invention showing an accordion-like apparatus;

FIGURE 5 is a cross-sectional view of still another embodiment of the apparatus; and FIGURE 6 is a plan view of a further embodiment of the invention in telescoping arrangement.

Turning now to the darwings in greater detail, a simple but representative embodiment of the invention is illustrated in FIGURE 1. As seen therein the device consists of a housing 10 which is shaped in the form of an elongated tube having a front end member 12 and a rear end member 14 forming end closures for said housing. The housing 10 may be made of any suitable material, for instance, wood, metal, paperboard, plastic or even black roofing paper. The inner surfaces 16 of the housing 10, and the end members 12 and 14 should be of a dull, dark material so as to maintain total darkness within the enclosure and so as not to have light reflecting surfaces. The reason for this will become more apparent hereinafter when it is more fully explained that the viewer should see only one point source of light in the proper use of the invention.

In the rear end member 14 there is mounted a light generating element 18 which, in the embodiment shown in FIGURE 1, is illustrated as a small electric bulb 20 mounted in a socket and adapted for connection to an electrical circuit by means of the cord 22. A small rectangular housing 24 shades the bulb 20 but has a pin-point source of light or opening 26 in it, through which a ray of light is emitted into the housing 10. It will be understood that the point ray of light may be supplied by any suitable means other than the electric bulb 20. For example one may employ a carbon arc or one may simply use daylight or artificial room light made to beam against the point opening 26 in sufficient intensity to emit a ray into the housing 10.

At the opposite end of the housing 10 (FIG. 1) in the front end member 12 there is positioned a viewer or eyepiece 28, preferably formed integrally with the member 12, or attached thereto in light excluding arrangement. The eyepiece 28 may take the form of a generally rectangular member as shown in the drawings or it may be oval, square or rounded on the ends with an indentation in the middle to admit the nose of the viewer in much the same way that goggles do. The eyepiece 28 is substantially dish shaped as seen better in FIGURES 2 and 3. From an outer rim 30 the eyepiece curves inwardly and the sides 32 join integrally with a base grid plate 34 which is characterized by a number of holes 36, 36 extending therethrough. The holes should be in a hexagonal pattern with respect to each other, that is, an individual hole in the inner portion of the grid 34 should be surrounded by six holes all evenly spaced from the reference hole and from each other. The holes may be any shape such as circular, oval, triangular, rectangular, hexagonal, etc. but they should be small in size, as, for example, 1/32 of an inch in diameter in the case of a circular hole. The grid 34 is relatively thin in order that no reflections can arise from the sides of the bore of the hole. Alternatively, one may make the grid of a dull material that will not reflect, or one may coat the inner bore of the holes 36 with a dulling or non-reflecting material such as lead dust or fine carbon black. The same may be said of the pin-point opening 26, that it should not give off reflections from the inner bore of the opening, and that it can be made non-reflecting as just described.

The grid plate or simply, the grid 34 is shown as an integral part of the viewer 28 in these drawings but it should be understood that it may be removable from the viewer as by being a thin sheet that slides into a slit in the viewer. In more elaborate apparatus adapted for a wider variety of tests the removable grid feature may be incorporated.

There is a slit 38 in the eyepiece 28, as illustrated in FIGURES 1 and 2. The slit is adapted to receive a shutter 40 which is made of an opaque material, or of a colored transparent material such as red glass. The shutter 40 may be moved up or down or to the side as illustrated by the arrows in FIGURE 3, for reasons that will be discussed in detail hereinafter in connection with the operation of the apparatus as a testing device.

Within the housing 10 there is a member 42 (FIG. 1) which we shall call a near point reference element and which consists of a baffle 44 of substantially the same shape as the cross-sectional dimension of the housing 10. The baffle 44 is mounted on the hinges 46 so that it can be laid flat or stood up as shown by the arrows in FIGURE 1. Movement of the baffle 44 is facilitated by the handle 48, and it may be held in upright position by the stop 50 attached to the inner wall of the housing 10. The baffle and its supporting parts just described should be made of, or coated with, a non-reflecting material so that no reflections will exist when the baffle 44 is in flat position and a person is looking through the viewer 28 at the point source of light 26.

When the baffle 44 is in raised or upright position it will be observed to have a point source of light 52 in the center thereof, which may correspond to the point source 26 in the rear member. The near point source 52 may be a bulb showing through a tiny hole in the baffle as illustrated in FIGURE 1 where the bulb is adapted for connection to a source of electric current by means of the cord 54, or it may simply be a tiny hole which falls into alignment with the ray of light emitting from the bulb 20 through the opening 26 and beamed toward the viewer 28. In this case a person looking through the viewer will see the near point source 52 even though the light is coming from the bulb 20.

In order to make the near point reference element effective for the hereinafter described tests it must be illuminated on the side facing toward the viewer. An electric bulb 56 is shown for this purpose in FIGURES 1 and 2 and this bulb is provided with a switch and cord (not shown) for lighting it when the baffle 44 is upright, and extinguishing it when the baffle is flat. Here again the bulb 56 may be replaced by any other suitable means for illuminating the interior of the housing 10. For example, one may simply have a hinged or slidable panel (not shown) in the top or side of the housing, or over the viewer 28, and, when illumination of the interior is desired, the panel is shifted to open position to admit light.

FIGURE 4 shows another embodiment of the apparatus which is characterized by being adapted for expansion or contraction in length. The front end member 58 corresponds in details with that shown in FIGURE 1 and needn't be discussed at length. Likewise the rear member 60 corresponds with that shown in FIGURE 1. In place of the rigid tube or housing 10 of FIGURE 1 however, the apparatus of FIGURE 4 has an accordion pleated cover 62 forming the enclosure with the end members. The pleated cover 62 may be made of paper, cloth or like material customarily employed in making bellows or accordions, in being understood that the material should be capable of excluding light and should not give off reflections from its inner surfaces.

An advantage of the embodiment shown in FIGURE 4 is that it can be extended to its full length and will then resemble the apparatus of FIGURE 1 with the center baffle 44 in reclining position. In collapsed position the device shown in FIGURE 4 performs the same function as does the embodiment of FIGURE 1 when the baffle 44 is in upright position. Additionally, the device of FIGURE 4 may be collapsed fully to a small size convenient for carrying.

The rectangular box illustrated in FIGURE 5 represents still another embodiment of the invention. An eyepiece or viewer 64 is substantially the same in detail as that shown as 28 in FIGURE 1. It differs in being hinged at 66 so that it may be swung out from the bottom and brought into direct line viewing of the light 68, which is also hinged so that it may be brought into the same plane as the viewer 64. When both the light 68 and the viewer 64 are in closed or perpendicular position the beam of light from 68 is cast upon the slanted mirror 70 and reflected therefrom to the mirror 72, and on to the viewer 64. In this manner the beam of light is made to travel a relatively long distance within a small enclosure, and give the illusion of being far away.

The mirror 72 is mounted for adjustment on the bracket 74. The interior of the box 76 is substantially light proof and all surfaces are dull to prevent reflections, as described more fully in relation to FIGURE 1.

It is apparent that by proper adjustment of the viewer 64 and the light 68 one may obtain the illusion that the light is relatively far away (when beam is reflected from mirrors to viewer), or relatively close (when viewer and light are slanted to provide direct viewing). In the latter case the interior of the box should be illuminated, as by the lamp 78, or by opening a sliding panel (not shown) to emit light from the outside.

The embodiment in FIGURE 6 is a very simple monocular instrument resembling a telescope somewhat in general appearance. The cylindrical case 80 has an end cover 82 having a pinhole opening 84 adapted to emit light. The cylinders 86 and 88 are adapted to telescope into the case 80. An eyepiece 90 is at one end of the cylinder 88, and a grid 92 is located within the cylinder a short distance inwardly from the eyepiece 90. The device is shown in extended position for far point viewing but it may be collapsed for near point viewing. In common with the other illustrated devices the interior of the device should be light proof and of non-reflecting materials. There should be means for illuminating the interior for near point viewing as described in detail for FIGURE 1.

The operation of the various devices is substantially the same so only one will be described, with appropriate notations whenever the differences between embodiments is significant. The apparatus of FIGURE 1 is operated by first plugging in the cord and energizing the light 20 so that a point source of light is directed into the housing 10. The baffle 42 is in reclining position and the light 56 is off. The device is now ready for what is called "far point" viewing.

The person whose eyes are to be tested comes close to the eyepiece 28 and looks through the grid 34 at the point source of light. The black walls and non-reflecting surfaces within the housing 10, along with the darkness within the housing, all combine to give the person viewing the idea that the point source of light is at infinite distance from him, or at least, far away. This causes the lens of the eye to relax.

Looking through the grid at the point source of light, the person reports what he sees. If his eyes are normal he will see a single point source of light. If he suffers either from myopia (nearsightedness) or from hyperopia (farsightedness) he will report that he sees several small points of light in a cluster.

The test is then repeated for each eye separately with the shutter 40 being operated to blank out one eye at a time. In this way one may determine if one or both eyes have abnormal vision, and the relative degree of the abnormality on a rough basis.

At the same time the subject can be tested for astigmatism. With one eye blanked by the shutter 40 the patient reports what he sees. If he sees only a single point source then he has no astigmatism. If, on the other hand, he reports that he sees a series of lights arranged in a row, or in an oval cluster, then he suffers from astigmatism in that eye. The axis of astigmatism can be determined with accuracy from the slope of the line of lights or from the long axis of the cluster, and the degree of astigmatism by how the lights are distorted from a circular pattern.

A further check can be made at this time. Looking through the grid at the point source with only one eye, the patient reports what he sees. If he reports a single point source of light the eye may be normal. In order to check this point a second shutter is lowered slowly, covering the lines of holes successively. It should be noted here that there will be quite a number of holes in an area as large as the pupil of the eye. If the point source of light goes out all at once when the last hole near the bottom of the pupil is covered, the eye is truly normal.

If the eye is astigmatic and the patient reports seeing a number of lights lined up in a row slanted from the vertical, the same descending shutter test is used. As the shutter slowly descends over holes in the grid the patient will report that some of the lights are going out. If he reports that the lights are going out from top to bottom then the eye is myopic; if going out from bottom to top( opposite the direction of movement of the shuter) the eye is hyperopic.

Having conducted all of the foregoing tests as "far point" viewing the device is then converted to "near point" viewing by raising the baffle 44 to upright position and turning on the lights 56 and 52. As previously explained, conditions are present during "far point" viewing that cause the eye to relax and the lens to approach fully relaxed position. In "near point" viewing the situation is opposite; the lens is made to contract and conditions simulate the position of the eye while reading, as a book. The tests previously described for "far point" viewing are now repeated for "near point" viewing. A comprehensive picture of the eye has now been obtained and any basic faults of the vision of the eye have been uncovered.

From all of the foregoing detailed description it will now be understood that the invention provides an apparatus and method for testing visual abnormalities in a quick, inexpensive, foolproof way. The apparatus comprises an enclosure providing a darkened interior, means in the enclosure adapted to emit a point source of light therein, and a perforate grid mounted in the enclosure in spaced relationship with the point source means, and adapted for viewing said means through the perforations of the grid.

While certain embodiments of the invention have been described herein, these are, by no means, all of the embodiments contemplated by the invention. They are meant to be illustrative only, but not limiting. All equivalent structures and methods that may occur to one skilled in the art are expressly intended to be covered by this invention, within the limits of the scope of the appended claims.

I claim:

1. An apparatus for testing for visual abnormalities which comprises an enclosure providing a darkened interior, means in said enclosure adapted to emit a point source of light therein, and a multi-perforate means mounted in said enclosure in spaced relation with said means, and adapted for viewing said means through the perforations thereof, said perforations being arranged in regular hexagonal pattern with a center perforation equidistant from all others in said pattern.

2. An apparatus for testing for visual abnormalities which comprises an enclosure providing a darkened interior, means in one end of said enclosure adapted to emit a point source of light into said enclosure, and a multi-perforate grid in the opposite end of said enclosure adapted for viewing therethrough the interior of said enclosure and said point source of light, said perforations being arranged in regular hexagonal pattern with a center perforation equidistant from all others in said pattern.

3. An apparatus for testing for visual abnormalities which comprises an enclosure normally providing a darkened interior, means in one end of said enclosure adapted to emit a point source of light into said enclosure, multi-perforate grid means spaced apart from said first means and adapted for viewing therethrough the interior of said enclosure and said point source of light, said perforations being arranged in regular hexagonal pattern with a center perforation equidistant from all others in said pattern and means for illuminating all parts of the interior of said enclosure.

4. The apparatus of claim 3 with the addition of means for converting said device from a far point viewer to a near point viewer.

5. An apparatus for testing for visual abnormalities which comprises an enclosure normally providing a darkened interior, far point means in one end of said enclosure adapted to emit a point source of light into said enclosure, multi-perforate grid means in the opposite end of said enclosure and adapted for viewing therethrough the interior of said enclosure and said point source of light, said perforations being arranged in regular hexagonal pattern with a center perforation equidistant from all others in said pattern near point means intermediate the ends of said enclosure and hinged for swinging movement into and out of viewing position, and means for illuminating said near point means.

6. An apparatus for testing for visual abnormalities which comprises an enclosure normally providing a darkened interior, means in one end of said enclosure adapted to emit a point source of light into said enclosure, multi-perforate grid means in the opposite end of said enclosure and adapted for viewing therethrough the interior of said enclosure and said point source of light, said perforations being arranged in regular hexagonal pattern with a center perforation equidistant from all others in said pattern, said first means being adapted for relative movement with respect to said perforate means for far point viewing and near point viewing.

7. The apparatus of claim 6 with means for illuminating said first means when it is in near point position.

8. An apparatus as in claim 6 in which said enclosure is made up of a plurality of members adapted to telescope within one another.

9. An apparatus as in claim 6 in which said enclosure is of pleated accordion type.

10. The apparatus of claim 2 including an addition means adjacent said grid adapted to receive a shutter, and shutter means for covering a portion of said grid.

11. An apparatus for testing for visual abnormalities which comprises a substantially light free box, an electrical point source of light mounted in one wall of said box, a viewing eyepiece mounted in the opposite wall of said box, a perforate grid interposed between said eyepiece and said point source, said grid having a plurality of small holes arranged in substantially hexagonal pattern and being close enough together as to provide at least three aligned holes in an area of the size of a substantially completely expanded iris of the human eye.

12. The apparatus of claim 11, with the addition of a shutter adapted to cover a portion of said grid.

13. The apparatus of claim 11 with the addition of means for illuminating the interior of said box with light.

References Cited in the file of this patent

UNITED STATES PATENTS

| | | |
|---|---|---|
| 929,134 | Hughes | July 27, 1909 |
| 968,981 | Reese et al. | Aug. 30, 1910 |
| 1,235,170 | Thorner | July 31, 1917 |
| 1,358,789 | Scarsten | Nov. 16, 1920 |
| 2,283,769 | Schwanzel | May 19, 1942 |
| 2,385,992 | Jobe | Oct. 2, 1945 |
| 2,481,582 | Ellis | Sept. 13, 1949 |

FOREIGN PATENTS

| | | |
|---|---|---|
| 1,121,789 | France | May 7, 1956 |
| 439,375 | Great Britain | Dec. 5, 1935 |
| 655,535 | Great Britain | July 25, 1951 |
| 785,796 | Great Britain | Nov. 6, 1957 |

OTHER REFERENCES

Otten article in The Optician (British), vol. 113, issue No. 2936, July 11, 1947, pages 504–506.